June 9, 1953 B. N. SLADE 2,641,639

POINT ELECTRODE FOR SEMICONDUCTOR DEVICES

Filed Dec. 23, 1949

Inventor
BERNARD N. SLADE

By

H. O. Newton

Attorney

Patented June 9, 1953 2,641,639

UNITED STATES PATENT OFFICE 2,641,639

POINT ELECTRODE FOR SEMICONDUCTOR DEVICES

Bernard N. Slade, Morristown, N. J., assignor to Radio Corporation of America, a corporation of Delaware Application December 23, 1949, Serial No. 134,660

4 Claims. (Cl. 175—366)

Figure 1:
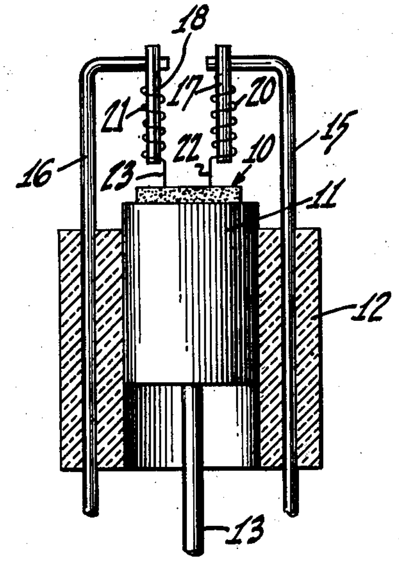

This invention relates generally to semi-conductor devices, and particularly relates to the construction of the point electrodes of a three-electrode semi-conductor device which may provide an amplifier, oscillator or the like.

A semi-conductor amplifier or oscillator may include a semi-conducting crystal such as a germanium block and a low-resistance non-rectifying electrode in contact with the germanium crystal. This electrode is usually called the base electrode and may have a large-area contact with the crystal. The device further includes two or more electrodes in rectifying contact with the crystal. These electrodes have a high-resistance contact with the crystal and usually are point electrodes. If a small forward bias voltage is impressed between the base electrodes and one of the rectifying electrodes, the rectifying electrode functions as an emitter of charge carriers and is therefore called the emitter electrode. If a large reverse bias voltage is impressed between the base electrode and the other rectifying electrode, the second rectifying electrode functions as a collector of the charge carriers and is therefore called the collector electrode. A device of this type has been termed a transistor. It may, for example, have two emitter electrodes, on each of which is impressed a different signal to provide a modulator or mixer.

Difficulty has been experienced in the construction of the point electrodes, that is, the emitter and collector electrodes. These electrodes usually consist of wires having pointed ends which contact the crystal and which are spaced apart a few mils. Sometimes the point electrodes contact a surface area of the crystal which will not provide good amplification. However, with prior art devices it is not possible to shift the contacts so that the device either must be discarded or rebuilt. Furthermore, it is necessary to provide a sharp point on the electrode wires. Thus, it has not been possible heretofore to use such fine wires that they need not be pointed because in that case it is not possible to provide enough force for pressing the electrodes against the crystal to provide the required contact pressure. It would therefore be desirable to provide a transistor with point electrodes constructed in such a manner that the position of the point electrodes may be changed even after the device has been assembled.

It is accordingly an object of the invention to provide a semi-conductor device having improved point electrodes which are mechanically stable, easy to mount and which are inherently pointed so they need not be pointed as a separate preparatory operation.

A further object of the invention is to provide a transistor having improved emitter and collector electrodes which may be moved at will to new positions after the transistor has been assembled, thereby to make it possible to contact a good surface area of the crystal with point electrodes.

A semi-conductor device comprises a semi-conducting body such as a germanium block and a low-resistance base electrode in contact with the block. In accordance with the present invention the rectifying electrodes consist each of a fine wire which is wound to form a helix so that each wire functions as a compression spring. The free ends of the wires preferably extend substantially parallel to the axis of the helix and are pressed against a preferably plane surface of the crystal. The base electrode may consist of a metallic film which covers the germanium crystal with the exception of a small surface area. In that case, the rectifying electrodes contact the surface area of the crystal which is not covered by the metallic film. Such a base electrode has been disclosed and claimed in a copending application to Slade and Nelson, Serial No. 113,304, filed on August 31, 1949, and entitled "Semi-Conductor Amplifier or Oscillator Devices."

Figure 2:
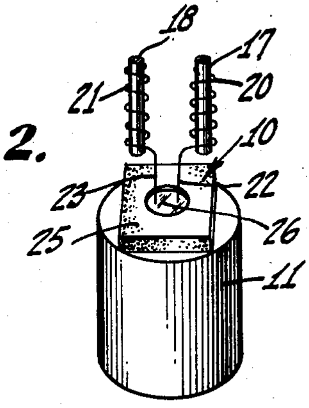

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is an elevational view, partly in section, of a semi-conductor device embodying the present invention; and Figure 2 is a view in perspective of a portion of the device of Figure 1.

Referring now to the drawing in which like components have been designated by the same reference numerals throughout the figures, there is illustrated a semi-conductor device embodying the present invention which may be used as an amplifier, oscillator or the like. The device comprises a block or body 10 of semi-conducting material consisting, for example, essentially of a chemical element having semi-conducting properties such as germanium, silicon, boron, tellurium, or selenium containing a small but sufficient number of atomic impurity centers or lattice imperfections as commonly employed for best results in crystal rectifiers. Germanium is the preferred material for block 10 and may be prepared so as to be an electronic N type semi-conductor crystal as is well known. The top surface of semi-conducting block 10 may be polished and etched as is conventional. It is also feasible to utilize the germanium block from a commercial high-back-voltage germanium rectifier such as the type 1N34.

Block 10 is secured to stem 11 which may, for example, consist of brass and which may have a cylindrical shape as illustrated. Block 10 preferably is secured to stud 11 by soldering or sweating. Stud 11 is disposed in insulating hollow cylinder 12 which may consist, for example, of Bakelite or Durez. Stud 11 has a press fit with cylinder 12 so that it may be forced through cylinder 12 but will normally remain in its position with respect to cylinder 12. A heavy wire 13 may be secured to stud 11, for example, by forcing it into a suitable recess in the stud.

Two heavy wires 15 and 16 extend through cylinder 12. The upper ends of wires 15 and 16 are of U shape as shown to form two mandrels 17 and 18 which are spaced from body 10 as clearly shown in the drawing. Mandrels 17, 18 may be welded to wires 15, 16 as illustrated. Stud 11 forms the base electrode of the device of the invention and has a low-resistance, non-rectifying contact with body 10.

In accordance with the present invention the two point electrodes of the device consist of wires 20 and 21 which may have a diameter between 1 and 2 mils such as 1.2 mils. The wires may consist of tungsten or Phosphor bronze. Each wire 20 and 21 is wound about its mandrel 17 and 18 respectively to form a helical compression spring. The free ends 22 and 23 of wires 20 and 21 preferably extend substantially parallel to the axis of their respective helix. The free wire ends 22 and 23 are in contact with the substantially plane surface of body 10 to form point electrodes.

Since the wires 20, 21 are very thin it is not necessary to point their ends 22 and 23. On the other hand, it is possible to exert sufficient force against the body 10 by virtue of the spring action of the wire relix. It is not necessary to weld wires 20 and 21 to their mandrels 17 and 18 because the electric contact resistance between the wires and their mandrels which touch each other will normally be sufficiently low.

The device illustrated in Figure 1 is assembled as follows: Body 10 is soldered to stud 11 and wires 20 and 21 are wound about their mandrels 17 and 18. Now stud 11 is forced against the wire ends 22 and 23 until electric contact is made. Thereafter the stud is advanced a further distance to compress springs 20, 21 thereby to exert a predetermined force between wires 20, 21 and body 10. The spacing between the free ends 22 and 23 should be of the order of a few mils, such as two mils. If wires 20, 21 should touch a dull, dirty or pitted portion of the surface of body 10, they may be moved to another surface portion of the body and then formed again by electric pulsing, as is conventional. The position of wire ends 22, 23 may be changed by rotating springs or wires 20, 21 about their mandrels 17, 18 if the springs are not welded to their mandrels. Alternatively, wire ends 22, 23 may be moved to another portion of the surface of body 10 by lifting them with a pair of fine tweezers and resting them on another surface portion of body 10. Thus, the completed device permits greater flexibility because wires 20, 21 may be moved to contact a selected surface portion to provide for a better amplifying action. Power gains between 24 and 26 db (decibels) have been obtained at conventional operating conditions with devices constructed in accordance with the present invention.

It is also possible to wind a fine wire such as 20 about a long rod or mandrel from which pieces of suitable length are cut off. The cut-off mandrels with their springs may then be welded to leads 15, 16 as shown in Figure 1.

Instead of sweating or soldering body 10 to stud 11 it is also feasible to provide a base electrode of the type disclosed and claimed in the above referred to Slade-Nelson application. Thus, as clearly shown in Figure 2, body 10 may be covered with a metallic film 25 with the exception of a surface area 26. The metallic film may be provided in any suitable manner such as by evaporating the metal onto body 10 and by masking off a surface area 26 which may have any desired shape. Wire ends 22 and 23 should contact the uncovered susface area 26 of the crystal. Stud 11 may again be soldered to metallic film 25 to make electric contact therewith.

There has thus been disclosed a semi-conductor device having improved point electrodes which are mechanically more stable and easier to mount. Furthermore, the contacts may be moved over the crystal surface until a good surface area is found even after the device has been assembled. The point electrodes may be made of wires which are so thin that they need not be pointed.

What is claimed is:

1. A semi-conductor device comprising a semi-conducting body having a substantially plane surface, a metallic film covering said body with the exception of a predetermined area of said plane surface, a pair of mandrels supported above said surface and extending substantially at right angles thereto, and a pair of fine metallic wire compression springs, each surrounding one of said mandrels and having a free end in contact with said predetermined surface area and extending substantially at right angles thereto.

2. A semi-conductor device comprising a semi-conducting body having a substantially plane surface, a metallic film covering said body with the exception of a predetermined area of said plane surface, a pair of mandrels supported above said surface, a pair of fine metallic wire compression springs, each surrounding one of said mandrels and having a free end extending substantially parallel to the axis of its mandrel and in contact with said predetermined surface area, and means for pressing said spring against said surface.

3. A semi-conductor device comprising a semi-conducting body, a metallic film covering said body with the exception of a predetermined surface area, a pair of spirally wound conducting wires, each having a free end in contact with said surface area, and means for individually supporting said wires and exerting predetermined pressure through said free ends against said body.

4. A semi-conductor device comprising a semi-conducting body, a metallic film covering said body with the exception of a predetermined surface area, a pair of spirally wound fine metallic wires, each having a free end extending substantially parallel to its spiral axis and in contact with said surface area, a pair of mandrels for individually supporting said wires, and means for exerting predetermined pressure through said wires against said body.

BERNARD N. SLADE.

References Cited in the file of this patent

UNITED STATES PATENTS

| Number | Name | Date |
|---|---|---|
| 1,104,065 | Miessner | July 21, 1914 |
| 2,432,594 | Thompson et al. | Dec. 16, 1947 |
| 2,486,776 | Barney | Nov. 1, 1949 |
| 2,563,503 | Wallace | Aug. 7, 1951 |

FOREIGN PATENTS

| Number | Country | Date |
|---|---|---|
| 277,348 | Italy | Sept. 5, 1930 |